Feb. 14, 1967 R. P. DIXON 3,303,881
UNDERGROUND NUCLEAR DETONATIONS FOR TREATMENT
AND PRODUCTION OF HYDROCARBONS IN SITU
Filed Nov. 22, 1963 2 Sheets-Sheet 1
FIG.1 FIG.2
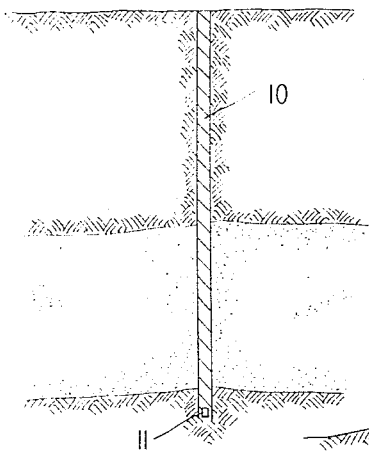
FIG.3
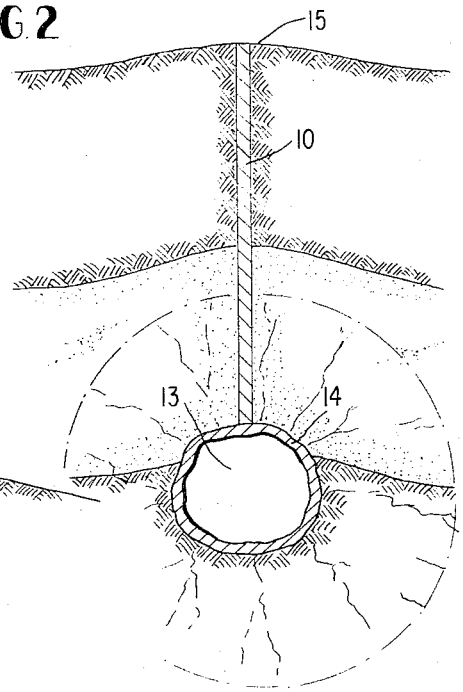
FIG.4
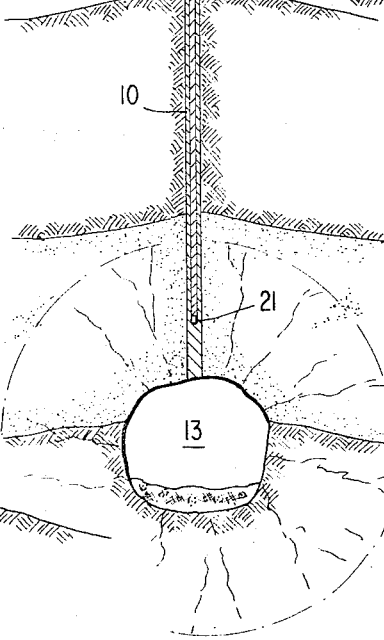
FIG.5
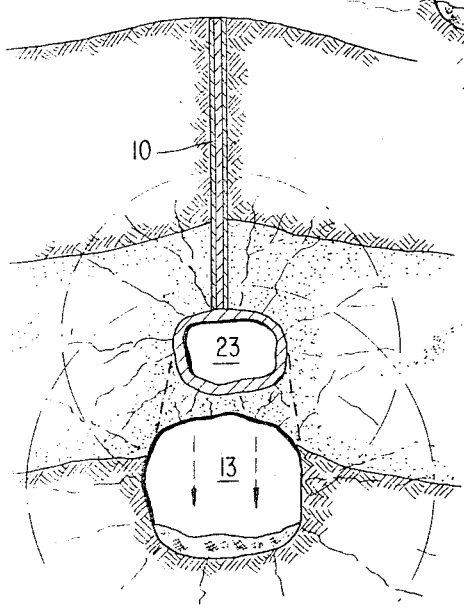
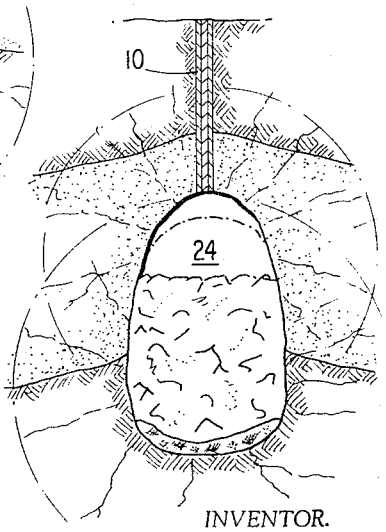
INVENTOR.
ROD P. DIXON
BY
*Burns, Doane, Benedict, Swecker & Mathis*
ATTORNEYS

INVENTOR.
ROD P. DIXON

United States Patent Office 3,303,881
Patented Feb. 14, 1967

3,303,881
UNDERGROUND NUCLEAR DETONATIONS FOR TREATMENT AND PRODUCTION OF HYDROCARBONS IN SITU
Rod P. Dixon, Salt Lake City, Utah, assignor to Nuclear Processing Corporation, Salt Lake City, Utah, a corporation of Utah
Filed Nov. 22, 1963, Ser. No. 325,721
16 Claims. (Cl. 166—36)

This application is a continuation-in-part of my copending applications Serial No. 789,747, filed January 28, 1959, and Serial No. 833,443, filed August 13, 1959, both, now abandoned, the complete disclosures of which are herein incorporated by reference.

The invention relates to the use of underground nuclear detonations to create permeability and apply energy to a hydrocarbon containing geological formation. Because in an underground nuclear detonation only 8% of the energy is initially distributed in the cavity formed, and 92% in the formation surrounding the detonation cavity, and because only a small part of such surrounding formation lies radially about the cavity at a temperature that would make usable products it is necessary to use several nuclear detonations in an appropriate relation to each other. In this manner more energy is applied to the formation located between any two detonations than would be necessary to merely create permeability since it takes more energy to create the heat required in this invention than to create permeability.

The energy that is usable to get useful products from hydrocarbonaceous deposits such as oil shale by using underground nuclear detonations is in three forms: (a) shock energy distributed in the formation at the time of a detonation which decreases with distance from the detonation point at at a ratio between the cube root and the square root of the distance (b) the sensible heat of gases and liquids migrating from the cavity created (c) migrating similar heat from other points in the formation lying about a detonation point. Besides oil shale the invention is particularly applicable to formations such as tar sands, oil sands, bituminous limestone, kerogen rocks, peat coals and anthracite coals. In accordance with the invention enough energy is placed in the formation located between two detonation points by consecutive detonations to destructively distill a substantial portion of the high boiling hydrocarbons. Because energy at a given point will be lost by doing work or by taking products having heating value, a part of this invention is the use of nearby space related nuclear detonations to reheat the previously treated formation by new shock wave action and by migrating heat.

Ultra-sonic energy may be used as a part of this invention. Ultra-sonic energy, or energy having a very short wave length, is known to have the capacity to move thru matter and not lose its energy quickly. And it is known to have the quality of selectively affecting matter. Such energy may be used to add further energy on a selective basis to the hydrocarbon deposit being treated.

A nuclear detonation is used in this invention to treat the geological formation surrounding the detonation point. Since increased depth of placement allows the use of higher yield detonations up to a megaton or more and such larger yields bring about economies in production it is preferable to use for the first detonation as large a fusion device as is available and practical, though this may require placing it below a hydrocarbon containing rock formation. In such a case only a minor proportion of the energy released may be in the hydrocarbon formation and a major proportion of the energy may be dissipated below the formation, but this still may be more economical than emplacing a smaller device wholly within the hydrocarbon bearing formation. The zone treated will vary with the particular detonation involved: if the detonation is the first of a series and is placed deep it will affect primarily the area above. If the detonation is the last of a vertical sequence of detonations the primary area affected by it will be below.

The type of work done in a formation about a nuclear detonation point depends upon the qualities of the formation and the distance of the point from a given size detonation. It is a feature of this invention that heat is imparted to the formation by the shock wave causing compression of compressable material in the formation: i.e. cavities of small or large size may be deliberately created at one point in order that a nuclear device of a larger yield may be detonated at another point, the cavities serving to stifle the explosive force of the latter detonation by increased local absorption of its shock wave.

It is an object of this invention that only a part of the radial sequence in a given formation produced by the detonation of a device may be used, even though about a detonation a like effect is common.

It is an object of this invention to treat oil shale and similar formations up to 3,000′ or more in thickness. This will require a plurality of detonations set off in a series vertically above each other as well as other subsequent detonations emplaced laterally from said vertical series of detonations. Where devices mainly of fusion are used and are placed so that no venting occurs these may be placed above each other without much risk of causing harmful radiation for in the larger devices only 5% is fission. In a vertical series of detonations where the maximum tolerable device is used at the bottom, the next higher should be of smaller size, so as to not vent, and should be placed at a point where combined energies contained in the respective cavities created by them and in the portion of the formation extending between these cavities are sufficient to effect substantial restoring or destructive distillation throughout the broken formation which is caved downward by such second detonation.

A feature of the placement of detonations vertically above each other is that more formation above a lower detonation is block-caved downward into the lower cavity and thus two cavities, or more, are joined into one vertical column of crushed rock retaining essentially all of the energies released in the respective cavities and the rock formation between them.

A given detonation will distribute energy radially thru a formation, such energy being initially in the form of a shock wave. There will be a temperature curve radially outward from a given detonation point. Sequentially outward from this point the formation will have been converted to a gasified, a melted, a sintered, a crushed and a fractured zone. Each of these zones will have a temperature curve decreasing outward from the detonation point. Sequentially outward from the edge of the cavity or gasified zone the energy left in the form of heat will create chemical changes in minerals depending upon the temperature, time, pressure and associated minerals. These changes can be computed if the nature of the minerals, the nature of the formation and the temperature curve are exactly known.

As to that part of the temperature curve that lies within the detonation cavity all matter will have been reduced to a gas. There will be a surface displacement which in a solid formation will about equal the cavity created therein and the formation above the top of the cavity will be arched additionally and there may be a parting of the horizontal strata of the formation. The gas in the cavity will be composed of those gases that are formed from the minerals at the temperatures and pressures that are initially present at the various points in the cavity from the detonation point outward to the edge of the cavity, depending on the conditions and mineral composition present at each point. The temperature of the cavity may average about 3,000° C.

Next to the cavity the temperature may range from about 3,000° C. down to about 1,500° C. Any minerals or chemicals present which will become volatile at those temperatures, including all available hydrocarbons, will be vaporized. Limestone may yield carbon dioxide. Gases or vapors made at a given point will vary with the mineral, temperature, pressure and time, but the gases will in any case tend to escape into the cavity after its initial expansion as indicated in the Rainier test.

As indicated in the Rainier test into the cavity is distributed about 5 to 10% of the initial detonation energy. About 15 to 25% goes into the narrow zone which when the cavity is first formed lies next to the initial formation that is vaporized. The remaining 65 to 75% or so of the energy is distributed between the crushed area and the fractured zone which are located outward from the edge of the melted zone.

In the zone lying outside the melted zone the temperature curve will drop outwardly from the range of 1500° C. down to ambient. Depending upon the size of the particles after crushing, the minerals present and their content of organic hydrogen, the proportion of free hydrogen available, the temperature and the time, various products will be made from the original hydrocarbons. Since the premeability here is not likely to allow product passage they will remain predominantly where created unless and until further permeability is created by subsequent detonations.

As to what products will be made it is known that at 250° C. to 800° C. kerogen distills into a gas that will condense upon cooling. In the 250 to 800° C. zone a condensable gas thus will be made. In zones hotter than this permanent gases are made: i.e. ethane, methane, hydrogen, etc. Again, the nature of the minerals and their organic content, the proportions of free hydrogen available, and the specific conditions prevailing in this zone will to some extent affect the specific product distillation obtained.

It can thus be seen that even though a predictable temperature curve for a given detonation in a given kind of formation can be stated, the products that will be made at the various points about a detonation may vary from case to case. Of course, any energy that is superimposed upon an essentially known temperature curve will contribute toward making more condensable or non-condensable gas or it will raise a formation temperature to a point where further incremental energy can made a desired product.

A feature of this invention is that it works somewhat like well known hydrocarbon recovery procedures. In the autoclave retort broken shale is heated by a gas burner and depending upon the temperature gases of various kinds are recovered. In the Bureau of Mines NTU retort burning of the carbon produces a gas which moves ahead of the burning front heating the shale and distilling out the kerogen. In underground burning the burning of the carbon residue pushes in front of the combustion a heated gas front which distills out the product.

Essentially kerogen, which is minutely associated with other minerals, is heated in all such processes by gas migrating inward thru minute fissures and entry to the minute fissures is gained by passing thru the spaces surrounding the broken hydrocarbon. In this invention the energy is imparted to the kerogen particles: (a) by shock energy which creates heat directly by compressing the kerogen unit or the gases associated with it (b) by migrating heat from the cavity or a closer and hot area.

When an area filled with broken shale, or made permeable, has created recoverable products they must be taken to provide a place for migrating energy to come into contact with kerogen where not all of the products have been distilled out.

In this invention a column of crushed rock or shale is created vertically in a formation, which may be 3,000' thick, which column is created by vertically spaced nuclear detonations in such relation that the area between each pair is caved downward so that the vertical column of crushed hydrocarbon bearing mineral is created. The pieces will be varied in composition and size, for the radial sequence of melted, crushed and possible fractured zones arching over the cavity created by the first and bottommost detonation will be crushed downward into the first cavity by the next higher detonation. However, no matter the size of the resulting pieces they will have some energy imparted by the shock waves produced by the first as well as the next detonation and will be bathed in the temperature that prevails in the "vertical retort."

A further feature of this invention is that spaced laterally from a first vertical column produced by a series of superimposed nuclear detonations there will be placed another such series of superimposed detonations to create at least one other such column and to impart enough energy to the formation therebetween to effect substantial destructive distillation throughout this inbetween portion of the formation.

Creation of laterally spaced columns of vertical series of detonations may continue until a substantial continuous underground block of the hydrocarbon formation has been both broken and heated. Then wells will be drilled into a row of columns near one end of said block, as in common oil and gas drilling. At various points in any vertical column the presence and nature of products and temperature will be tested again as in conventional oil land gas production zone testing. From those zones where desired products are found they will be taken. If the temperature at a point in the hole indicates that there is sufficient energy present to distill further products therefrom, time may be allowed for this and products may be taken later. When it is deemed economical to impart further energy to the block or field a further row of vertical detonations may be set off at the outer boundary of the last row of detonations.

At each point of detonation a shock wave will be set up and move radially outward therefrom. In the prior rows of vertical detonations or columns the shock wave will impart further energy to the broken shale and surrounding gas. The previously crushed shale will likely be less strong than in its initial state as the surfaces will have been irregularized as to each other. The shock wave will heat both the crushed pieces and the gases in between. As products are taken from a producing well at the far end of the field gases will move through the field towards the point of taking as in a regular gas or oil field. Where heated gases permeate untreated kerogen they will raise its temperature and cause it to distill. Thus, a continually moving field is created.

Whereas prior processes, such as that described in U.S. Patent No. 1,422,204, created permeability by conventional means with only poorly created small fissures, the nuclear detonations arranged in accordance with this invention create massive and extensive cavities by humping the surface and caving downward. This brings about vastly greater permeability than would mere fracturing of a formation without substantial surface displacement.

Further novelty of the invention resides in that it can avoid the need for producing energy undeground by burning, which proved to be uneconomical because the permeability created was not sufficient to allow the created products to advance ahead of the burning front, the combustion wasted valuable product, and also the air supplied to maintain the burning contained unwanted nitrogen which diluted the product. Even where pure oxygen was used such did not succeed as then the burning was too hot unless the ratio of oxygen to carbon dioxide was meticulously controlled, which control has been impossible to maintain in large scale practice.

An advantage of the nuclear detonation method of creating permeability and applying energy is that a vast amount of energy can be cheaply placed in the ground.

This invention proposed placing detonations on closer centers with relation to each other than would be done if fracturing or creation of permeability were the only criteria; the radial area about a detonation that is made permeable is vastly greater than an area into which enough energy is placed to do useful work in hydrocarbons as required herein. For instance, using 1.7 kiloton devices of the type used in the "Rainier" test, it would be sufficient to place these approximately 500 feet from each other to effect fracture of the formation therebetween. However, to impart enough heat to the formation lying between two such devices as required in this invention, these devices should be spaced no more than 200 feet and preferably about 100 to 150 feet from each other. Of course, when more powerful devices are used they can be placed at appropriately greater distances apart.

Nuclear detonations by compact nuclear devices possess a utility totally different from that possessed by conventional detonations; to emplace a million tons of TNT underground would require a cave big enough to hold 25,000 box cars whereas a megaton of nuclear energy can be provided by a device in the range of 6′ in diameter and 15′ long; since the detonation speed of TNT relative to a nuclear device is slow, rather than a shock wave, which would impart energy to the formation as required in this invention, an explosion of a comparable large amount of TNT would heave into the atmosphere a vast block of formation and even though this settled back, only permeable would have been imparted to it.

An advantage of this invention is that it provides a method for treating economically a hydrocarbon-containing formation of great vertical thickness and of great horizontal distance, by resort to nuclear devices. It is based on the discovery that although in the detonation of only one such device most of the energy released is incapable of utilization, a proper correlation of a multiplicity of such detonations permits a high degree of utilization of all the energies released since the resulting superimposition of the low level energies will escalate them to a level sufficiently high to cause product distillation or other useful work.

This invention makes use of the 10 to 100 million degree detonation temperature of nuclear fusion detonations. This initial temperature causes a cavity to be vaporized in the rock formation and a high energy shock wave to pass through it. It is the initial vaporizing that facilitates containment of the energy underground and cause the high speed shock wave to travel radially in all directions from the point of detonation.

It is essential to this invention that energy predominantly of nuclear fusion rather than fission be used. Nuclear detonations can vary from pure fission to about 5% fission and 95% fusion. The low yield devices are pure fission. At 100 kt. about 30% fission and 70% fusion, and at 1 megaton about 5% fission and 95% fusion can be obtained. Fusion has a large prompt radiation release whereas fission has in the main a long term radiation release. For product cleanliness the long lived fission products should be kept at a minimum.

The cost per pound of fissionable materials is many times that of material used in the production of fusion energy, and this cost differential is further multiplied in that fusion material produces several times the amount of energy produced by the same amount of fission material. Thus fusion differs in kind from fission on theoretical as well as highly practical grounds.

An advantage of the invention is its simplicity in that it is easier to place and detonate compact nuclear devices in predetermined relation to each other than to first break a formation by blasting, and then impart heat to it by burning, all the while attempting to exercise fine control over the combustion in order to make the whole procedure workable.

The invention permits maximum utilization of the energy of the detonations. If a single detonation only or a plurality of widely separated unrelated detonations is resorted to the cavity left behind by each such detonation will have gases so highly heated as to be decomposed to compounds of little commercial value. To the extent hydrogen was present in combined form in the formation it will tend to appear in the form of free hydrogen after the detonation, relatively useless by itself. Such a hydrogen, however, can have value because of its sensible heat and its ability to combine with other substances. Also, when such hot hydrogen comes into contact with distillable hydrocarbons, distillation can be promoted. These effects are utilized in the present invention. If the pieces of broken shale are large distillation may not occur immediately but such will come about in time; the heated gases will heat and permeate the pieces of rock and distill products therefrom.

In addition, the free hydrogen, under proper circumstances of pressure, time, heat and an appropriate organic substrate to act upon can produce hydrocarbon products of improved quality.

Where there is but a single detonation the cavity will be too hot and not commercial, the volatiles in the melted region will emerge into the cavity, and outside the melted zone temperature capable of causing distillation will prevail in only a narrow zone. After the shock wave has passed any products released by distillation will tend to be locked in the formation. Only in that part of the zone surrounding the detonation that lies above the cavity will substantial permeability be created upon cave-in. Since 92% of the energy imparted lies outside the cavity this is wasted except for that part that is thus made permeable.

However, when the full area above a detonation is eventually block caved down in accordance with this invention, not only is the material available for distilling but essentially all of the energy imparted therein is used as a part of the total distilling energy. And where a broad vertical and horizontal multiple detonation treatment is contemplated in a field so as to treat eventually all of the hydrocarbon-containing material present, it is clear that all of the formation into which energy is imparted by the detonations eventually uses that energy.

The object to treat a vast vertical and horizontal area has the advantage that almost total product recovery can be had, i.e., any piece of hydrocarbon material will fully distill regardless of size if the distilling time is long enough, and this time is determined by the length of time it takes for available heat to reach the center of the piece and for the products to get out. Where one eventually contemplates within say a 10-year period the exhaustive treatment of a zone 3,000′ thick and possibly 10 or 20 miles square, product recovery utilizing the imparted energy can be extended over a long period of time. Since each square mile of oil shale of 3,000′ vertical dimension has over a billion barrels of oil there would be 100 billion barrels in a 10-mile square area. And, since a long time can be allowed for distilling here without any significant increase in cost, substantially complete recovery by distillation of the hydrocarbon content of the formation can be economically realized, thereby constituting a far reaching advantage of this invention.

Another advantage of the invention over any prior mining and retorting process is that in the latter there should be a minute crushing to shorten the distilling time and to get full recovery, or else long heating and distilling times must be provided. These expedients tie up expensive equipment and makes the recovery process costly. In this invention time of distilling is largely immaterial and the degree of crushing is of only secondary importance.

In the case of a nuclear detonation about 20% of the energy released lies in the melted formation surrounding the created cavity. In a short period the melted mineral has largely slipped to the floor of the cavity where it hardens in a period of a few months. The use of most of this energy is a feautre of this invention, for a nearby detonation, either vertically or horizontally in relation thereto, will crack or fissure this hardened formation and allow the circulation of gases therein. If all desired hydrocarbon products have been initially removed from the melted and hardened mineral the mere moving of the remaining energy by means of gases to areas where products can be made will be useful.

The whole area that is broken and being treated will not usually be homogeneous as to presence of products and temperature and pressure. At any given point the mineral present, the gases present, the temperature, and the pressure will determine the product composition obtained. When any product, initially a condensable gas or a non-condensable gas, is made its movement out of any given piece of hydrocarbon containing mineral will be determined by the pressure. Fluid products will tend to move from a high pressure to a low pressure area.

It is a feature of this invention that all products formed will move horizontally and vertically from areas of greater total or partial pressure to areas of lesser corresponding pressure, namely, in the main, from the most recent points of detonation to the points at which products are being taken. Should condensable hydrocarbon gases be cooled to their condensing point they will become an oil. Upon becoming re-heated they will again become gas.

All usable products will be taken, however, in any part of the permeable formation where a drill hole is placed. The gas will tend to contain both condensable and non-condensable fractions, which can be separated at the surface as in conventional oil and gas production. Non-commercial products, as hydrogen and carbon dioxide, can be re-inserted into the formation. Carbon dioxide can be re-inserted to be used as a driving and heat transfer medium.

This invention creates in a large field or area vertically and horizontally pieces of hydrocarbon-containing mineral such as shale or tar sand that can be treated with heat to bring about destructive distillation. The energy sources are the detonations. Once permeability has been created and sufficient energy imparted throughout a given block of formation as taught herein, then by common techniques oil and gas can be moved horizontally and vertically in the formation. Vertically, if there is an area that has too much heat such heat can be transferred into an area that is underheated by means of fluid product circulated through an appropriately located well interconnecting the two areas. Similarly, if the pressure in an area is too great such can be released toward an area where the pressure is too little, simply by tapping the two areas with a drill hole and interconnecting them.

When conventional detonations were used in the past to fracture hydrocarbon-containing formations the essential problem was encountered that the permeability created was so minute that the pressure required to force energy through the fractured formation made the process uneconomical. This difficulty is avoided in this invention in which all formation above the detonation is arched upward, eventually causing a substantial surface rise which in the main subsides and causing a correspondingly greater degree of permeability below. The cavity formed by a detonation about equals the surface displacement, and this space is utilized by the consecutive downward cave-ins of rock fractured in the later, superimposed detonations. As a result, permeability is fairly homogeneous and little pressure is needed to move product therethrough.

A further problem encountered by those who used conventional detonations to fracture was that treatment of the formation was irregular; the energy imparted by later means tended to channel into the preexisting more permeable zones thus reducing the efficiency. In the present process this problem is avoided since a cave-in in the direction of previously created permeability is actually desired and at the same time the extreme high speed of the explosion front from a nuclear detonation still assures that the released energy will be more or less evenly distributed radially in all directions.

The invention permits imparting energy to a formation at a point distant from an energy source through the use of a high speed shock wave. This, of course, cannot be done by a conventional detonation.

A feature of the invention is the treatment of a vast vertical section and a vast horizontal section of a hydrocarbon deposit that requires at least 250° C., and preferably at least 400° C., to distill useful products therefrom. Of course, formations requiring lower distillation temperatures, e.g., about 100° C. in the case of tar and bituminous sands, can likewise be treated in accordance with this invention and of course will require less close spacing of the detonations if a lower minimum temperature is sufficient to cause the desired extent of product distillation.

Previously proposed uses of nuclear detonations to hydrocarbon deposits mainly contemplated individual detonations below a 100' to 330' section so that upon fracture and caving the hydrocarbon present would be heated to a flowing temperature by the heat in the cavity. This can be shown to be based on a false premise in that if the formation above the detonation is strong it will keep the cavity from caving in to any major extent for such a long interval that the energy will become dissipated from the cavity area by running out horizontal fissures. Further, upon looking at the Rainier energy pattern showing about 80° C. as the maximum temperature about five months after the detonation, it becomes apparent that this was too low to be effective in hydrocarbon distillation.

If only a 300' vertical formation were treated, the criterion of permeability would not indicate the need for any further vertical detonation nor lead to any particular consideration of the area between horizontal detonations.

Although the prior art realized that vast heat and pressures would be produced around the detonation cavity, one of the few constructive suggestions concerning its use involved its utilization to bring about chemical or phase transformations in situ such as the synthesis of diamonds from inserted carbon specimens. A feature of the present invention is to use those energies at the point of detonation primarily to facilitate recovery of useful hydrocarbon products, not at the instantaneous tens-of-millions degrees of heat at the moment of detonation but, at the soon achieved temperatures of about 2,000° C. or less, so as to bring about distillation.

In this invention, nuclear device yield is spoken of in general terms rather than specifically, because such yield at this stage of the art's development is not predictable with a high degree of accuracy. Although a known amount of fission or fusion material may be used, the extent to which it becomes energy is not exactly predictable; its measurement in above ground detonations involves measuring the hydrodynamic growth of the fireball, and in underground detonations the measurement of the shock wave and later measurement of the radiation released. From such measurements the yield of similar devices can be predicted with an accuracy sufficient for the purpose of this invention.

In particular it should be noted that the present invention contemplates the consecutive detonation of nuclear devices placed above each other to form a vertical of crushed mineral, rows of such columns being produced across the length of the field to be treated. To the extent that the formation treated will be largely homogeneous and the devices used will be essentially similar in their energy yield, temperature distribution and nature of products obtained across the field can be determined with a considerable degree of accuracy by drilling test wells and taking samples and measurements at various locations in the field following the first few detonations. One of the significant facts to bear in mind is that in any part of the formation where a temperature of 250° C. or more, e.g., up to 800° C., is created desired products will begin to be released. At temperatures above about 800° C. less valuable, non-condensable gases will be produced. Of course, producing wells are best located at those points where test readings and samples indicate a high concentration of the type of product desired. It can thus be said that one of the prime objects of the invention is to create in a determinate and broken portion of a field, such as an oil shale deposit, temperatures from about 250° C. to 1500° C.

Since in underground explosions a larger detonation causes essentially only more of the same effect than a detonation of a smaller size, there is no basic requirement that the yield best suited for each case can be pointed out in detail. Additionally, since there is no practical way to measure the permeability created in a fractured formation except that products pass therethrough, this factor necessarily constitutes the criterion for this feature and is determined empirically from case to case in accordance with techniques well known in the conventional oil production art. Accordingly, device yield is non-critical in the present invention, and it does not much matter whether at a given point a 10 kt., 1 megaton or 10 megaton device is used, except that the larger ones properly placed will create more of the desired effect at lower cost. It is the case that the smaller the yield the more fission occurs proportionally and this will have an effect upon the amount of long lasting radioactivity at a detonation point. Also, the device size must be geared to the depth as the placement of large devices at too shallow a depth will cause venting of the created radiation. Methods of computing the minimum depth required for the safe containment of a device of any given size are presently well known to persons skilled in this art.

The present invention is consistent with findings published in connection with prior underground nuclear detonations, in particular the Rainier and the Gnome detonations performed by the U.S. Atomic Eenergy Commission. If the formation to which this invention is applied is similar to Gnome, similar physical effects would result excepting that here the substantial presence of hydrocarbons contemplated in this invention will produce a large volume of gaseous hydrocarbons as well as some hydrogen. Where the temperature and conditions are such as to release large amounts of free hydrogen, such hydrogen will of course require appropriate space for containment but will be useful in increasing the amount of drive gas as well as in forming various natural gases by reaction under proper conditions with carbonaceous material present.

An object of the invention is to create throughout most of the entire area made permeable temperatures that will make products. There is no specific zone aimed at, there is no specific distance from a detonation that is specifically the best or only producible. Since the producing wells are advantageously drilled down the center of a column formed by a series of vertically superimposed detonations no specific choice of well location need be made except that in the case of oil shale, for instance, it is preferable to produce from a well which taps in a zone that was exposed to a temperature of at least about 250° C. in one of the early detonation rows.

A feature of the invention is that gas and product movement is obtained. For this reason, drilling to a specific point from the surface in relation to a detonation point is not critical. All zones heated enough to make a gas are useful; if a zone heated to only about 250° C. then a liquid product or a condensable gas is distilled out slowly; if about 300° C. to 800° C., then liquid product and condensable gas is sequentially made more rapidly as the temperature increases; above that, non-condensable gases are made; above 1500° C. hydrogen mainly is made which upon combining with other gases and products will make a commercially more desirable gas as well as serve as a drive gas in the formation.

A feature of the invention is that despite usually incomplete knowledge about the structure and composition of the formation to be exploited, and the variable permeability and variable temperatures created therein, products are made in essentially all parts of the formation treated. Areas remaining non-productive at an early stage of the process are made productive as later detonations are set off.

By using a plurality of correlated detonations the invention produces a totally different effect from that of a single detonation or a plurality of unrelated single detonations, and overcomes the inherent disadvantages of the latter, such single detonations being of very limited value in that the cavity gases of themselves would not be useful and the overhead caved material would use only a very small of the energy released in the detonation.

The advantage of nuclear over conventional detonations is that conventional detonations will not create a cavity of high temperature and distribute the released thermal energy in a solid formation.

The advantage of using a fusion device, i.e., a device releasing only a small amount of nuclear fission products, is important because only that way can physiologically harmful radiation be kept within tolerable limits and the process made commercial. And correlated multiple detonations to emplace in a determinate zone the energy necessary for product distillation are essential, for if this is not done most of the valuable energy released in the detonation will be uselessly dissipated and no practical result will come about.

In the attached drawing:

FIGURE 1 is a vertical section through a geological formation having a nuclear device emplaced at the bottom of a shaft.

FIG. 2 is a vertical section through the formation after detonation of the nuclear device.

FIG. 3 is a vertical section through the formation showing the emplacement of the next nuclear device in the shaft above the cavity created by the first detonation.

FIG. 4 is a vertical section through the formation shortly after detonation of the second device.

FIG. 5 is a vertical section through the formation after detonation of the second device and after the rock between the two cavities has been block caved downward.

Figure 6:
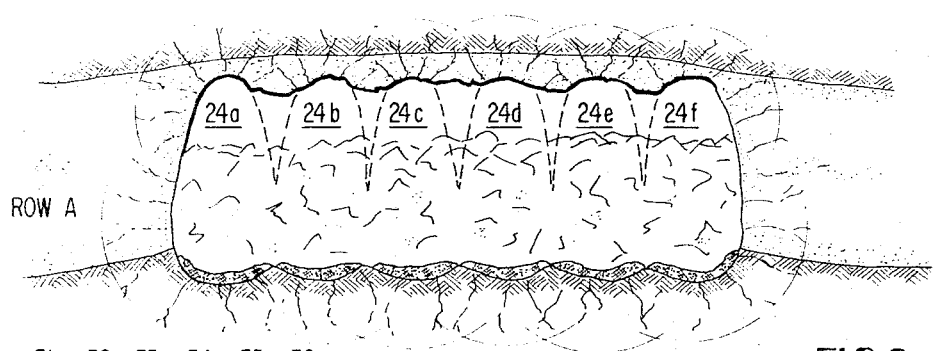
FIG. 6 is a vertical section through a formation showing a row of columns created by a series of vertically spaced and laterally displaced detonations, wherein progressively smaller devices were used in the creation of each vertical column.

The invention will now be further exemplified with reference to a specific embodiment as applied to an oil shale deposit such as that found in the State of Utah, township 9 south, range 20 east, section 16. In this deposit, the overburden containing essentially no oil shale is about 1800′. Below this there is an oil shale stratum running to a depth of about 3,000′, and this stratum contains about 15 gallons of solid hydrocarbon per ton of shale. At the center of the section to be treated entry to the formation is secured by drilling a calox hole or by sinking a shaft 10 as shown in the attached drawing. A 100 kt. nuclear device 11 being about 30% fission and 70% fusion is emplaced at a depth of 3,400′ in means of entry. The hole is then filled with cement and rock to plug it and insure complete containment of the detonation, and the device is detonated by means of controls at the surface.

Upon detonation the shock wave will vaporize the formation in a radius of several hundred feet from the detonation point, thereby forming cavity 13 (FIG. 2). Outward therefrom the formation will be melted. While the melted material immediately after detonation may be larger in volume than the gas in the cavity, the melted material soon is to form a relatively narrow zone 14 around the cavity when the gas in the latter becomes fully expanded. A surface displacement about equalling the cavity size takes place and the formation above the cavity will be arched upward as shown at 15 (FIG. 2). Fractures will appear, mostly horizontal, and extrusion of the melt will occur into these. Upon migration of heat horizontally along the fractures the roof of the cavity will cave in partially.

Referring to FIGURE 2, the temperature of the cavity 13 shown thereon will be about 3,000° C. before collapse, the temperature of the melted zone 14 will be about 1,500° C. and outwardly therefrom there will be a rapidly descending temperature gradient.

As shown in FIGURES 3 and 4, a second nuclear device 21 of about 60 kt., i.e., of a somewhat smaller energy content than the first device, is next emplaced after drilling the well open again at a point above the first so that after resealing and detonation the heat and temperature in the first cavity 13 and the new cavity 23 and the energy therebetween is enough to substantially distill the kerogen from the formation between the two cavities. An additional criterion for the size and location of the upper device is that it must block cave the formation beneath it into the first cavity 13 and it must be deep enough in the ground to avoid venting. FIGURE 5 shows the block caving of the formation between the two cavities and the forming of one single pear shaped cavity or column 24a.

FIGURE 6 shows the arrangement of five additional vertical columns (24b, c, d, e and f), similar to column 24a and forming a row A therewith, so arranged in relation to each other as to provide enough heat in the entire row to distill out the kerogen present therein. To assure this result, for economic reasons the bottommost device in each column usually will be the largest and the higher ones will be progressively smaller. It may be advisable to emplace the bottommost devices close enough to each other so that their cavities will overlap, thus permitting the uppermost devices of adjacent columns still to be placed close enough together to provide the necessary heat of distillation even in the upper regions of the treated stratum.

Figure 7:
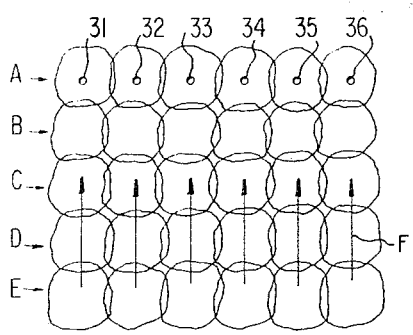
FIG. 7 is a plan view showing the relation of five adjacent vertical rows of columns detonated across the length of a field and the emplacement of producing wells at one side of the field.

FIGURE 7 shows, in plan view, the relation of four additional rows B, C, D and E detonated across the length of the field, all adjacent columns being in substantially the same relation to each other as described above with reference to the columns in row A, and producing wells 31, 32, 33, 34, 35 and 36 drilled through the first row (row A) of columns at one side of a detonated field. Products will flow from the field to the producing wells in the direction indicated by the arrows.

Figure 8:
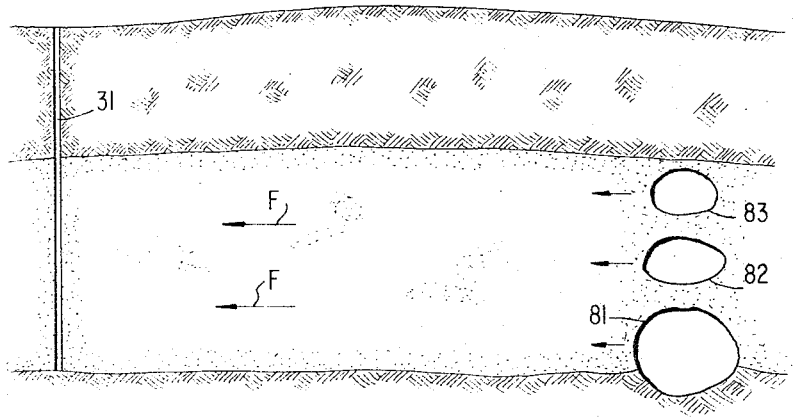
FIG. 8 is a vertical section through a detonated field such as that illustrated in FIG. 7, with arrows indicating the direction of flow of products toward a producing well.

FIGURE 8 shows, in vertical cross-section, the taking of products by a well 31 on one side of a nuclearly created field and the flow of products through a field as indicated by arrows F, and the detonating of a new series of vertical detonations 81, 82 and 83 to supply further energy in the field for distilling and displacing more product.

Figure 9:
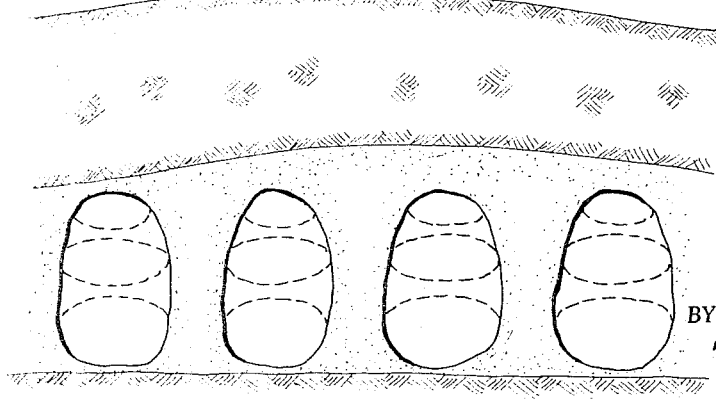
FIG. 9 is a vertical section through a field containing several adjacent vertical detonated columns wherein nuclear devices of essentially equal size were used in creating the columns.

FIGURE 9 shows an alternate arrangement wherein all devices used are essentially of equal size, in which event the cavities need not touch, but formation inbetween will be fractured and have enough heat imparted to it to destructively distill substantially all of the kerogen present.

Having described the invention, it is particularly pointed out and claimed in the claims set forth below.

What is claimed is:

1. A process for the extraction of oil from an underground formation by in situ destructive distillation of carbonaceous material contained therein, which comprises sequentially placing a plurality of nuclear fusion devices in the formation through access channels, plugging each of said access channels before detonation of the respective device therein so that the force of the detonations will be substantially contained within the formation, maintaining on the surface control means to the nuclear fusion devices so that the detonations may be created at will, setting off the detonations when desired, thereby creating a cavity of superheated vaporized rock in the immediate vicinity of the detonation points and as far out as the detonation has the energy to vaporize said rock and heating the rock so that immediately outside the vaporized areas it becomes liquid and outside said liquid areas progressively outward it becomes sintered and slagged, crushed and fractured, and the heat from the detonation cavities will migrate outwards as areas of lesser pressures are found, said cavities collapsing as pressure is lost, said devices being placed at a proper depth to prevent rents, fissures and faults from penetrating to the surface and radiation from escaping to the surface, said devices further being placed in such proximity to each other that the formation therebetween is broken and made permeable to fluid products of destructive distillation of the kerogen content of the formation.

2. A process according to claim 1 wherein ultrasonic energy is separately created within said formation in a geometric pattern, using frequencies above sonic frequency and below 1 million frequencies per second and such that they will react substantially only upon the oil shale molecules, creating a multiplying effect by having the frequencies react upon the oil shale molecules when the resonance of each molecule will add to the force rather than subtract, thereby increasing recovery of liquid and gaseous oil shale products.

3. A process according to claim 1 wherein the carbonaceous material in the formation to be treated is selected from the class consisting of oil shale, tar sand, bituminous limestone, kerogen rock, peat coal and anthracite coal.

4. A process according to claim 1 wherein said devices are placed in such proximity to each other that the heat liberated by the detonations is sufficient to destructively distill the kerogen content from the formation lying between the detonations.

5. A process according to claim 1 wherein additional energy is applied to the formation subsequent to the detonations of the nuclear devices to assist in the destructive distillation of the kerogen content of the formation.

6. A process of producing useful fluid hydrocarbons from a geological formation containing a stratum of the group consisting of oil shale, tar sands, oil sands, bituminous limestone, kerogen rocks, and coals wherein hydrocarbons are locked in, which comprises emplacing a first charge of fusionable nuclear material near the floor of said stratum at a depth sufficient to avoid venting into the atmosphere upon detonation, and detonating said charge, thereby forming a first cavity near said floor; emplacing a second charge of nuclear fusionable material above said first cavity at a depth sufficient to avoid venting into the atmosphere and such that the hydrocarbon-containing formation below said second charge is block caved downwardly into said first cavity upon detonation of said second charge, and detonating said second charge, thereby forming a second cavity above said first cavity and block caving the formation located therebetween into said first cavity.

7. A process for producing useful fluid hydrocarbons from a geological formation containing a stratum wherein hydrocarbons are locked in, which comprises emplacing a first charge of fusionable nuclear material near the floor of said stratum at a depth sufficient to avoid venting into the atmosphere upon detonation, and detonating said charge, thereby forming a first cavity near said floor and distributing energy from said detonation to said stratum; emplacing a second charge of nuclear fusionable material in said stratum above said first cavity at a location such that the formation below said second charge is block caved downwardly into said first cavity upon detonation of said second charge, and detonating said second charge, thereby forming a second cavity above said first cavity, block caving the formation located therebetween into said first cavity, distributing energy of said first and second detonations in the resulting rock filled column and in adjacent portions of said stratum and converting at least a major portion of the original hydrocarbon content of said column and adjacent portions into fluid hydrocarbons under pressure; drilling a well from the surface into said column; and withdrawing fluid hydrocarbon products from said well.

8. A process according to claim 7 wherein said stratum is a stratum of oil shale.

9. A process for recovering useful hydrocarbons from a formation containing a stratum of oil shale which comprises emplacing in upward sequence a plurality of nuclear detonation charges, whereby each forms a cavity in said formation, each charge of nuclear fusion detonation being so spaced from the earth surface as to avoid venting into the atmosphere and each so spaced from the other so as to cave the portion of the stratum below a cavity into the next lower cavity formed by a preceding detonation, thereby forming a substantially vertical column of broken shale; drilling a well into said column, and withdrawing fluid hydrocarbons from said well, the energies in the cavities formed by the detonations plus the energy in the broken material therebetween being sufficient to destructively distill at least a major portion of the kerogen originally present therein.

10. A process according to claim 9 wherein the yield of at least the lowermost detonation charge is equivalent to the energy yield of not less than one megaton of TNT, each charge being selected to correspond substantially to the maximum practical detonation size as determined by (a) the depth of the detonation from the earth surface, (b) the distance between adjacent detonations, (c) the thickness of the shale stratum, and (d) the kerogen content of the shale.

11. A process according to claim 9 wherein said vertical column is one in a first row of a plurality of rows of similar vertical columns formed in a producing oil shale field, said columns being so spaced from each other that the energy released between adjacent columns is sufficient to fracture the shale therebetween and to supply sufficient energy to the inbetween zones so as to destructively distill a major proportion of the kerogen present therein.

12. A process according to claim 11 wherein the detonation charge emplaced at the bottom of each column is of at least one megaton TNT size and each progressively higher charge in each column is of smaller size, each such charge being substantially of the maximum size which can be emplaced at its depth without venting.

13. A process according to claim 11 wherein producing wells are drilled through several of said columns in said first row of columns and additional energy is imparted to said producing oil shale field by detonating further charges of nuclear material at a location remote from said first row of columns.

14. A process for the creation of permeability in and the emplacement of energy in a kerogen-containing shale formation which comprises emplacing a first lowermost megaton-size nuclear charge in the vicinity of the lower boundary of said formation at a depth from the earth surface sufficient to avoid venting and thereafter detonating said charge, thereby forming a cavity in said vicinity and imparting energy to said formation by action of a shock wave issuing outwardly from the detonated charge; emplacing a second megaton-size nuclear detonation charge at such a distance above the upper edge of said first cavity that detonation of said second charge will block cave the underlying formation into said first cavity and at a sufficient distance below the earth surface to avoid venting, thereby forming a first vertical column of broken shale; emplacing and detonating another lowermost nuclear charge at a point spaced laterally from the location of said first lowermost charge such that the energy from the detonations as imparted by the resulting shock waves on the formation between the detonations is enough to convert a major portion of the kerogen in such inbetween formation into distillable hydrocarbons; emplacing and detonating above said other lowermost charge a further nuclear charge, thereby forming a second vertical column of broken shale and supplying enough energy to said broken shale and to the shale in the formation between adjacent columns to destructively distill in situ therefrom at least a major portion of the hydrocarbon content originally present therein; drilling a well into one of said columns, and withdrawing useful hydrocarbon product from said well.

15. A process according to claim 14 wherein a charge placed in the formation at a given level after creation of increased permeability in the formation by intervening removal of hydrocarbon product therefrom is of a greater yield than a charge placed at said level at a different location prior to such removal.

16. A process according to claim 14 wherein a multiplicity of rows of like columns is produced across the length of an oil shale field and wherein producing wells are drilled in the row of columns which was the first row emplaced in said field.

References Cited by the Examiner

UNITED STATES PATENTS

| 1,422,204 | 7/1922 | Hoover et al. | 166—11 |
| 2,670,801 | 3/1954 | Sherborne | 166—9 |
| 2,756,826 | 7/1956 | Ebough | 166—36 |
| 2,973,312 | 2/1961 | Logan | 166—45 X |

FOREIGN PATENTS 1,167,517  6/1957  France.

OTHER REFERENCES

Chemical and Engineering News, January 19, 1959, pp. 21 and 22.

Time Magazine, March 24, 1958, p. 64.

UCRL 5253 (Plowshare Series), Industrial Uses of Nuclear Explosives, September 8, 1958, pp. 36–44 relied on.

CHARLES E. O'CONNELL, *Primary Examiner.*

S. J. NOVOSAD, *Assistant Examiner.*